(12) United States Patent
Srinivas (10) Patent No.: US 7,241,334 B2
(45) Date of Patent: Jul. 10, 2007

(54) SULFONATED CARBONACEOUS MATERIALS

(75) Inventor: Bollepalli Srinivas, Marietta, GA (US)

(73) Assignee: Columbian Chemicals Company, Marietta, GA (US)

(*) Notice: Subject to any disclaimer, the term of this patent is extended or adjusted under 35 U.S.C. 154(b) by 0 days.

(21) Appl. No.: 10/229,933

(22) Filed: Aug. 28, 2002

(65) Prior Publication Data

US 2004/0042955 A1   Mar. 4, 2004

Related U.S. Application Data

(60) Provisional application No. 60/382,801, filed on May 23, 2002.

(51) Int. Cl.
C09D 11/00 (2006.01)
C09C 1/48 (2006.01)

(52) U.S. Cl. .................. 106/31.6; 106/31.9; 106/472; 106/476

(58) Field of Classification Search ............. 106/31.6, 106/31.9, 472, 476; 423/460, 445 R, 449.2
See application file for complete search history.

(56) References Cited

U.S. PATENT DOCUMENTS

| 3,279,935 A | 10/1966 | Daniell et al. |
| 3,442,679 A | 5/1969 | Rivin et al. |
| 3,519,452 A | 7/1970 | Rivin et al. |
| 3,528,840 A | 9/1970 | Aboytes |
| 3,853,933 A | 12/1974 | Siciliano |
| 3,870,841 A | 3/1975 | Makowski et al. |
| 4,014,844 A | 3/1977 | Vidal et al. ............ 260/31.2 R |
| 4,081,409 A | 3/1978 | McNicol et al. |
| 4,237,323 A | 12/1980 | Aliev et al. |
| 4,241,112 A | 12/1980 | Kostandov et al. |
| 4,552,786 A | 11/1985 | Berneburg et al. |
| 4,582,731 A | 4/1986 | Smith |

(Continued)

FOREIGN PATENT DOCUMENTS

| EP | 0 360 399 A2 | 3/1990 |
| EP | 0 466 261 B1 | 1/1992 |
| EP | 1 085 034 A1 | 3/2001 |
| EP | 1 536 500 A1 | 6/2005 |
| JP | 59075943 | 4/1984 |
| JP | 62109821 | 5/1987 |
| JP | 3245850 | 11/1991 |
| JP | 8022827 | 1/1996 |
| JP | 2001-283865 | 10/2001 |
| JP | 2002-237229 | 8/2002 |
| JP | 2003-037435 | 2/2003 |
| WO | WO 01/015253 A1 | 3/2001 |
| WO | WO 01/45121 A1 | 6/2001 |
| WO | WO 03/099946 A1 | 12/2003 |
| WO | WO 03/100883 A2 | 12/2003 |
| WO | WO 03/100884 A2 | 12/2003 |
| WO | WO 03/100889 A1 | 12/2003 |
| WO | WO 2004/017446 | 2/2004 |
| WO | WO 2004/107359 A1 | 12/2004 |
| WO | WO 2006/036544 A2 | 4/2006 |

OTHER PUBLICATIONS

Löffler et al., "Activity and Durability of Water–Gas Shift Catalysts Used for the Steam Reforming of Methanol," Journal of Power Sources, 114(1):15–20 (2003).

(Continued)

*Primary Examiner*—J. A. Lorengo
*Assistant Examiner*—Veronica Faison-Gee
(74) *Attorney, Agent, or Firm*—Needle & Rosenberg P.C.

(57) ABSTRACT

The present invention provides methods for the incorporation of sulfonate functional groups onto the surface of carbonaceous compounds and materials, and similarly provides several surface modified carbonaceous compounds and materials resulting therefrom.

22 Claims, 5 Drawing Sheets

U.S. PATENT DOCUMENTS

| | | | |
|---|---|---|---|
| 4,610,938 A | 9/1986 | Appleby | 429/42 |
| 4,714,569 A | 12/1987 | Nishino et al. | 252/511 |
| 4,734,227 A | 3/1988 | Smith | |
| 4,737,384 A | 4/1988 | Murthy et al. | |
| 4,880,711 A | 11/1989 | Luczak et al. | |
| 4,970,093 A | 11/1990 | Sievers et al. | |
| 5,068,161 A | 11/1991 | Keck et al. | |
| 5,093,439 A | 3/1992 | Epstein et al. | |
| 5,152,801 A | 10/1992 | Altermatt et al. | |
| 5,156,651 A | 10/1992 | Girardeau et al. | |
| 5,250,163 A | 10/1993 | Epstein et al. | |
| 5,290,483 A | 3/1994 | Kulkarni et al. | |
| 5,316,990 A | 5/1994 | Cooper et al. | |
| 5,334,292 A | 8/1994 | Rajeshwar et al. | |
| 5,356,538 A | 10/1994 | Wai et al. | |
| 5,498,372 A | 3/1996 | Hedges | |
| 5,548,060 A | 8/1996 | Allcock et al. | |
| 5,554,739 A | 9/1996 | Belmont | 534/885 |
| 5,571,311 A | 11/1996 | Belmont et al. | 106/20 R |
| 5,595,689 A | 1/1997 | Kulkarni et al. | |
| 5,606,724 A | 2/1997 | Wai et al. | |
| 5,630,868 A | 5/1997 | Belmont et al. | 106/31.75 |
| 5,639,441 A | 6/1997 | Sievers et al. | |
| 5,672,198 A | 9/1997 | Belmont | 106/20 |
| 5,683,829 A | 11/1997 | Sarangapani | 429/42 |
| 5,707,432 A | 1/1998 | Adams et al. | 106/31.6 |
| 5,759,944 A | 6/1998 | Buchanan et al. | |
| 5,767,036 A | 6/1998 | Freund et al. | |
| 5,789,027 A | 8/1998 | Watkins et al. | |
| 5,803,959 A | 9/1998 | Johnson et al. | 106/31.75 |
| 5,837,045 A | 11/1998 | Johnson et al. | 106/31.85 |
| 5,851,280 A | 12/1998 | Belmont et al. | 106/472 |
| 5,871,671 A | 2/1999 | Kinlen et al. | |
| 5,900,029 A * | 5/1999 | Belmont et al. | 8/550 |
| 5,928,419 A | 7/1999 | Uemura et al. | |
| 5,932,144 A | 8/1999 | Shimizu et al. | |
| 5,939,334 A | 8/1999 | Nguyen et al. | |
| 5,976,233 A | 11/1999 | Osumi et al. | |
| 5,993,996 A | 11/1999 | Firsich | |
| 6,042,643 A * | 3/2000 | Belmont et al. | 106/472 |
| 6,117,581 A | 9/2000 | Shelef | |
| 6,132,491 A | 10/2000 | Wai et al. | |
| 6,132,645 A | 10/2000 | Hedges | 252/510 |
| 6,280,871 B1 | 8/2001 | Tosco et al. | 429/41 |
| 6,399,202 B1 | 6/2002 | Yu et al. | 428/403 |
| 6,451,375 B1 | 9/2002 | Cotte et al. | |
| 6,478,987 B1 | 11/2002 | Akita et al. | |
| 6,494,946 B1 * | 12/2002 | Belmont et al. | 106/472 |
| 6,524,383 B2 * | 2/2003 | Komatsu et al. | 106/493 |
| 6,541,278 B2 | 4/2003 | Morita et al. | |
| 6,572,227 B2 * | 6/2003 | Yamashita et al. | 347/100 |
| 6,592,938 B1 | 7/2003 | Pessey et al. | |
| 6,767,664 B2 | 7/2004 | Akita et al. | 429/42 |
| 6,770,393 B2 | 8/2004 | Akita et al. | 429/33 |
| 2001/0009733 A1 | 7/2001 | Campbell et al. | 29/44 |
| 2001/0024749 A1 | 9/2001 | Michot et al. | 429/122 |
| 2002/0006982 A1 * | 1/2002 | Kurabayashi | 523/161 |
| 2002/0020318 A1 * | 2/2002 | Galloway et al. | 101/401.1 |
| 2002/0088375 A1 * | 7/2002 | Komatsu et al. | 106/472 |
| 2003/0079643 A1 * | 5/2003 | Tomioka et al. | 106/31.27 |
| 2003/0095914 A1 * | 5/2003 | Belmont et al. | 423/449.2 |
| 2004/0072683 A1 | 4/2004 | Kodas et al. | 502/224 |
| 2004/0109816 A1 | 6/2004 | Srinivas et al. | 423/449.2 |
| 2004/0110051 A1 | 6/2004 | Srinivas | 429/33 |
| 2004/0110052 A1 | 6/2004 | Srinivas | 429/33 |
| 2004/0144961 A1 | 7/2004 | Srinivas | 252/500 |
| 2004/0166401 A1 | 8/2004 | Srinivas | 429/44 |
| 2004/0169165 A1 | 9/2004 | Srinivas | 252/511 |
| 2004/0186201 A1 | 9/2004 | Stoffer et al. | 523/215 |
| 2006/0068987 A1 | 3/2006 | Bollepalli et al. | |
| 2006/0099485 A1 | 5/2006 | Yamaguchi et al. | 429/42 |

OTHER PUBLICATIONS

Morrison et al., "Step–Reaction Polymerization," *Organic Chemistry*, Fifth Edition, Sec. 36 7:1249–1252 (1987).

Wei et al., "Stablization of Platinized Carbon Catalysts for PAFC," *Journal of Applied Electrochemistry*, 30:723–725 (2000).

Blackburn et al., "Reactive Deposition of Conformal Palladium Films from Supercritical Carbon Dioxide Solution," *Chemistry of Materials*, 12:2625–2631 (2000), no month available.

Blackburn et al., "Deposition of Conformal Copper and Nickel Films from Supercritical Carbon Dioxide," *Science*, 294:141–145 (Oct. 2001).

Cabanas et al., "A Continuous and Clean One–Step Synthesis of Nano–Particulate $Ce_{1-x}Zr_xO_2$ Solid Solutions in Near–Critical Water," *Chemical Communications*, 11:901–902 (2000), no month available.

Cansell et al., "Supercritical Fluid Processing: A New Route for Material Synthesis," *Journal of Materials Chemistry*, 9:67–75 (1999), no month available.

Johnston, "Safer Solutions for Chemists," *Nature*, 368:187–188, (Mar. 1994).

Kaupp, "Reactions in Supercritical Carbon Dioxide," *Angewadte Chemie*, 33:1452–1455 (1994), no month available.

Kordikowski et al., "Resolution of Ephedrine in Supercritical $CO_2$: A Novel Technique for the Separation of Chiral Drugs," *J. Pharm. Sci.*, 88:786–791, (Aug. 1999).

Long et al., "Chemical Fluid Deposition: A Hybrid Technique for Low–Temperature Metallization," *Advanced Materials*, 12:913–915 (2000), no month available.

Park et al., "Formation of Nylon Particles and Fibers Using Precipitation with a Compressed Antisolvent," *Industrial & Eng. Chem. Res.*, 41:1504–1510 (2002), no month available.

Shah et al., "Steric Stablization of Nanocrystals in Supercitial $CO_2$ Using Fluorinated Ligands," *J. Am. Chem. Soc.*, 122:4245–4246 (2002), no month available.

Watkins et al., "Chemical Fluid Depoisiton: Reactive Deposition of Platinum Metal from Carbon Dioxide Solution," *Chemistry of Materials*, 11:213–215 (1999), no month available.

Watkins et al., "Polymer/Metal Nanocomposites in Supercritical $CO_2$," *Chemistry of Materials*, 7:1991–1994, (Nov. 1995).

Watkins et al., "Polymerization of Styrene in Supercritical $CO_2$–Swollen Poly(chlorotrifluoroethylene)," *Macromolecules*, 28:4067–4074 (1995), no month available.

Uchida et al., "Effects of Microstructure of Carbon Support in the Catalyst Layer on the Performance of Polymer–Electrolyte Fuel Cells," *J. Electrochem. Soc.*, 143(7):2245–2252 (1996), no month available.

Chao et al., "A Study of Polypyrrole Synthesized with Oxidative Transition Metal Ions," *Journal of Polymer Science, Part A: Polymer Chemistry*, 26:743–753 (1988), no month available.

Internet website for Sigma–Aldrich for Product No. 530565, "Polyaniline (emeraldine salt)—composite with carbon black," www.sigmaaldrich.com (Apr. 6, 2004).

Internet website for Sigma–Aldrich for Product No. 530573, "Polypyrrole—composite with carbon black," www.sigmaaldrich.com (Apr. 6, 2004).

Lefebvre et al., "Electronically Conducting Proton Exchange Polymers as Catalyst Supports for Proton Exchange Membrane Fuel Cells," *Journal of Electrochemical Society*, 146(6):2054–2058 (1999), no month available.

Tsubokawa, "Functionalization of Carbon Black by Surface Grafting of Polymers," *Prog. Polym. Sci.*, 17:417–470 (1992), no month available.

Wampler et al., "Composites of Polypyrrole and Carbon Black: Part III. Chemical Synthesis and Characterization," *Journal of Materials Research*, 10(7):1811–1822 (1995), no month available.

Wei et al., "Synthesis of Highly Sulfonated Polyaniline," *Synthetic Metals*, 74:123–125 (1995), no month available.

Product Brochure entitled "Raven Blacks", published by Columbian Chemicals Company, Marietta, Georgia (Oct. 1999).

Mizuhata et al., "Morphological Control of PEMFC Electrode by Graft Polymerization of Polymer Electrolyte onto Platinum–Supported Carbon Black," *Journal of Power Sources*, 138:25–30 (2004).

Tsubokawa et al., "Grafting of Polyesters onto Carbon Black VI. Copolymerization of Aklylene Carbonate with Cyclic Acide Anhydride Initiated by Alkai Metal Carbozylate Groups on Carbon Black Surface," *Journal of Polymer Science: Polymer Chemistry Edition*, 23:489–500 (1985).

Tsubokawa et al., "Grafting of Polyesters on Carbon Black V. Preparation of Polyester–Grafted Carbon Black with a Higher Grafting Ratio by the Copolymerization of Epoxide with Cyclic Acid Anhydrides Using COOK Groups on Carbon Black as the Initiator," *Polymer Journal*, 16(4):333–340 (1984).

Tsubokawa et al., "Grafting of Polyesters onto Carbon Black. III. Polymerization of β–Propiolactone Initiated by Quaternary Ammonium Carboxylate Groups on the Surface of Carbon Black," *Journal of Applied Polymer Science*, 28:2381–2387 (1983).

Tsubokawa et al., "Grafting of Polyesters onto Carbon Black. II. Effect of Temperture Solvent on the Polymerization of β–Propiolactone initiated by COOK Groups on the Surface of Carbon Black," *Polymer Bulletin*, 7:589–596 (1982)

Tsubokawa et al., "Grafting or Polyesters onto Carbon Black. I. Polymerization of β–Propiolactone Initiated by Alkali Metal Carboxylate Group on the Surface of Carbon Black," *Journal of Polymer Science: Polymer Chemistry Edition*, 20:3297–3304 (1982).

Tsubokawa et al., "Reaction of Carbon Black Surface with Polymer Radicals Formed by the Thermal Decomposition of Azo or Peroxide Polymersm" *1995 Kobe International Rubber Conference*, Oct. $23^{rd}$–$27^{th}$, 1995, p. 307–310, 012, Kobe, Japan.

Raven® 3600 Ultra publication, Columbian Chemicals Company (Feb. 2004).

Raven Blacks publication, Columbian Chemicals Company (2004).

Ferraris, John P., et al.; "Grafting of buckminsterfullerence onto polythiophene: novel intramolecualr donor—acceptor polymers"; Optical Materials 9 (1998) p. 34–42.

U.S. Appl. No. 11/093,858, Response to Office Action, filed Feb. 5, 2007.

U.S. Appl. No. 10/786,652, Response to Restriction Requirement, filed Dec. 8, 2006.

U.S. Appl. No. 10/445,273, Office Action, filed Jan. 17, 2007.

U.S. Appl. No. 10/445,074, Response to Office Action, Dec. 8, 2006.

China Appl. No. 03811770.3, Response to Office Action, Dec. 19, 2006.

Eurasia Appl. No. 200401548, Response to Office Action with English translation, Jan. 9, 2007.

European Application No. 03729097 (Counterpart to U.S. Appl. No. 10/445,074), Response to Rule 51(4) Notice, Dec. 4, 2006.

European Application No. 03729097 (Counterpart to U.S. Appl. No. 10/445,074), Decision to Grant, Jan. 25, 2007

Eurasian Application No. 200401548 (Counterpart to U.S. Appl. No. 10/455,273), Office Action, Jan. 12, 2007.

Eurasia Application No. 200401552 (Counterpart to U.S. Appl. No. 10/445,090), Supplemental Search Report, Feb. 19, 2007.

* cited by examiner

Figure 1 XPS Survey Spectrum Untreated Carbon Black

Figure 2 XPS Spectrum of Sulfonated Carbon Black

Figure 3 XPS Spectrum of O1s Region in Sulfonated Carbon Black

Figure 4 XPS Spectrum of S2p Region in Sulfonated Carbon Black

Figure 5

Reaction Scheme 1 – Formation of Sulfite Intermediate $$(R\text{-}CO)_2O + H_2SO_4 \longrightarrow R\text{-}COO\text{-}SO_3H + R\text{-}COOH$$

Reaction Scheme 2 – Sulfonation of Carbonaceous Material

Reaction Scheme 3 – Neutralization of Sulfonated Carbonaceous Material

SULFONATED CARBONACEOUS MATERIALS

CROSS REFERENCE TO RELATED APPLICATION

This application claims the benefit of priority of U.S. Provisional Application No. 60/382,801, filed May 23, 2002.

FIELD OF THE INVENTION

The present invention relates to the surface modification of various carbonaceous materials and compounds. More specifically, the invention provides improved methods for the incorporation of sulfonate functional groups onto the surface of carbonaceous materials and compounds and similarly provides several surface modified carbonaceous materials resulting therefrom.

BACKGROUND OF THE INVENTION

The surface modification of carbonaceous compounds and materials has been widely explored as a means for achieving desired chemical and physical properties not normally exhibited by carbonaceous compounds and materials. Specifically, the introduction of sulfonate substituents, which are hydrophilic in nature, has been perceived as a potential means for enhancing the self-dispersibility and long-term stability of carbonaceous compounds and materials. Traditionally, various additives, dispersants and surfactants were used to improve the dispersibility and long-term stability of carbonaceous compounds and materials in waterborne systems. However, these materials only show marginal improvement in the dispersibility and stability of such carbonaceous compounds. Additionally, such additives can increase the viscosity of a dispersion, which would be undesired for particular end uses such as ink dispersions and, in particular, ink jet formulations. Moreover, these additives add significant costs and are therefore economically unfavorable as well.

To this end, several attempts have been made at sulfonating carbonaceous compounds and materials. However, these existing methods similarly produce, at best, undesired and marginal results. Specifically, the processes of the prior art present a considerable problem in that it is extremely difficult to avoid oxidation of a carbonaceous compound or material and the subsequent formation of tarry byproducts during the sulfonation reaction. Therefore, it is one object of the present invention to provide an improved process for the formation of sulfonated carbonaceous compounds and materials that substantially minimizes the oxidation of the carbonaceous compound(s) and formation of undesired and problematic tarry byproducts.

Additionally, the processes of the prior art only succeed in providing sulfonated carbonaceous compounds and materials having a minimal degree of surface substitution. To that end, it is a further object of the present invention to provide sulfonated carbonaceous compounds and materials having a surprisingly substantially improved degree of surface modification and thereby resulting in superior dispersibility and long-term stability in waterborne systems.

SUMMARY OF THE INVENTION

Among other aspects, the present invention is based upon inventive methods for the incorporation of sulfonate functional groups onto the surface of carbonaceous materials, and similarly provides several inventive surface modified carbonaceous materials resulting therefrom.

In a first aspect, the present invention provides a surface modified carbonaceous material comprising a plurality of sulfonate substituents of the general formula —$SO_3M$ surface bonded thereto, wherein M is hydrogen or a cationic species, and wherein the surface atomic concentration of sulfur present within the surface bonded $SO_3M$ moieties, measured by XPS, is greater than approximately 0.25% relative to the total surface atomic concentration of the surface treated carbonaceous material.

In a second aspect, the present invention further provides a process for the manufacture of a surface modified carbonaceous material, wherein the process comprises the steps of contacting an anhydride of the generic formula (R—CO)$_2$O with sulfuric acid under conditions effective to provide an organic sulfite intermediate of the generic formula R—(CO)O—$SO_3H$, wherein R is an aliphatic substituent. The process further comprises contacting a carbonaceous material with the organic sulfite intermediate provided in step a) under conditions effective to provide a surface modified carbonaceous material comprising a plurality of surface bonded sulfonate substituents of the general formula —$SO_3H$.

In a third aspect, the present invention also provides several end use formulations, including an aqueous composition comprising a surface modified carbonaceous material according to the present invention and water.

Additional advantages of the invention will be obvious from the description, or may be learned by practice of the invention. Additional advantages of the invention will also be realized and attained by means of the elements and combinations particularly pointed out in the appended claims. Therefore, it is to be understood that both the foregoing general description and the following detailed description are exemplary and explanatory of certain embodiments of the invention, and are not restrictive of the invention as claimed.

BRIEF DESCRIPTION OF THE FIGURES

The appended FIGS. 1–4, which are incorporated in and constitute part of the specification, illustrate the effectiveness of the process of the present invention to provide sulfonated carbonaceous materials having high rates of substitution, by plotting the X-ray Photoelectron Spectroscopy (XPS) spectrum of a sulfonated carbonaceous material of the present invention.

DETAILED DESCRIPTION OF THE INVENTION

The present invention may be understood more readily by reference to the following detailed description and any examples provided herein. It is also to be understood that this invention is not limited to the specific embodiments and methods described below, as specific components and/or conditions may, of course, vary. Furthermore, the terminology used herein is used only for the purpose of describing particular embodiments of the present invention and is not intended to be limiting in any way.

It must also be noted that, as used in the specification and the appended claims, the singular forms "a," "an," and "the" comprise plural referents unless the context clearly dictates otherwise. For example, reference to a component in the singular is intended to comprise a plurality of components.

Ranges may be expressed herein as from "about" or "approximately" one particular value and/or to "about" or "approximately" another particular value. When such a range is expressed, another embodiment comprises from the one particular value and/or to the other particular value. Similarly, when values are expressed as approximations, by use of the antecedent "about," it will be understood that the particular value forms another embodiment.

As used herein, a weight percent of a component, unless specifically stated to the contrary, is based on the total weight of the formulation or composition in which the component is included.

As used herein, the term "alky" refers to a paraffinic hydrocarbon group which may be derived from an alkane by dropping one hydrogen from the formula. Non-limiting examples include $C_1$–$C_{12}$ alkane derivatives such as methyl, ethyl, propyl, isopropyl, butyl, t-butyl, and isobutyl. To this end, it should be understood that an alkyl substituent suitable for use in the present invention can be a branched or straight chain alkyl substituent.

As used herein, the term "flocculation" refers to the combination or aggregation of suspended or dispersed particles in such a way that they form small agglomerates.

As used herein, the term "sulfonate substituent" refers to a functional substituent comprising the generic formula —$SO_3^-$. As it pertains the present invention, the sulfonate substituent can further comprise component M such that it has the general formula —$SO_3M$. For purposes of the present invention, M can be hydrogen or a cationic species such as sodium, potassium, lithium or ammonium.

As used herein, the term "surface bonded" refers to a substituent that is substantially bonded, either covalently or ionically, primarily or only to the outer surface of the carbonaceous compound or material. To this end, a substituent that is "surface bonded" is substantially absent from the inside or core of the carbonaceous compound or material.

As used herein, the term "cationic species" refers to a positively charged molecular or elemental species capable of forming an ionic bond with a sulfonate substituent as defined herein. Examples of cationic species suitable for use in with the present invention include, without limitation, ammonium, the group I alkali metals, e.g., lithium, sodium, potassium, rubidium, cesium and francium, as well as organic bases such as dimethylethanol amine (DMEA) and triethanol amine (TEA).

As used herein, the term "XPS" refers to X-ray Photo-electron Spectroscopy. Accordingly, all XPS measurements disclosed herein have been conducted using the Physical Electronics 5802 Multitechnique with Al Kα X-ray source.

As used herein, the term "carbonaceous material" is intended to include, without limitation, i) carbonaceous compounds having a single definable structure; or ii) aggregates of carbonaceous particles, wherein the aggregate does not necessarily have a unitary, repeating, and/or definable structure or degree of aggregation. For example, a carbon black material as used herein can be a carbon black compound having a definable structure or, alternatively, can also be an aggregate of carbonaceous particles wherein the exact structure or degree of aggregation is unknown.

As used herein, the term "optional" or "optionally" means that the subsequently described event or circumstance may or may not occur, and that the description includes instances where said event or circumstance occurs and instances where it does not. For example, the phrase "optionally substituted lower alkyl" means that the lower alkyl group may or may not be substituted and that the description includes both unsubstituted lower alkyl and lower alkyl where there is substitution.

As used herein, by use of the term "effective," "effective amount," or "conditions effective to" it is meant that such amount or reaction condition is capable of performing the function of the compound or property for which an effective amount is expressed. As will be pointed out below, the exact amount required will vary from one embodiment to another, depending on recognized variables such as the compounds or materials employed and the processing conditions observed. Thus, it is not always possible to specify an exact "effective amount" or "condition effective to." However, it should be understood that an appropriate effective amount will be readily determined by one of ordinary skill in the art using only routine experimentation As indicated above, the present invention relates to the incorporation of sulfonate derivatives, which are hydrophilic functional groups, onto the surface of various carbonaceous materials and/or compounds. To this end, in a first aspect, the invention provides a process for the manufacture of surface modified carbonaceous materials.

In accordance with this aspect of the invention, one embodiment provides a process comprising the steps of reacting an anhydride of the generic formula:

with a sulfuric acid under conditions effective to provide an organic sulfite intermediate of the generic formula:

In turn, a plurality of C—H surface sites present on a carbonaceous material or compound to be surface modified can then be reacted with the resulting organic sulfite intermediate set forth above, under conditions effective to provide a surface modified carbonaceous material having a plurality of sulfonate substituents, —$SO_3H$, surface bonded thereto.

According to the invention, R is aliphatic, preferably selected from the $C_1$–$C_{12}$ alkyl substituents. Additionally, it should be understood that these alkyl substituents can be straight chain or branched. Suitable examples include methyl, ethyl, propyl, isopropyl, butyl, isobutyl, t-butyl and the like. In a preferred embodiment, R represents a methyl substituent such that the anhydride employed in the process is an acetic anhydride. It will be appreciated by one of ordinary skill in the art that such anhydrides; e.g. acetic anhydride, are well known and commercially available and therefore need not be described in detail herein.

To this end, the anhydride serves not only as a reactant for the formation of the sulfite intermediate but can also serve as the solvent medium in which the reaction takes place. Therefore, the anhydride is preferably present in excess relative to the amount of both the carbonaceous compound or material and the acid. As such, it will be appreciated that any excess amount will be suitable for carrying out the desired reaction, however, in a preferred embodiment, the weight ratio of anhydride relative to the carbonaceous material is greater than approximately 2:1. Likewise, the weight ratio of anhydride relative to the acid is preferably greater than approximately 5:1.

As indicated above, the preferred acid for use in the process of the present invention is a sulfuric acid capable of reacting with a suitable anhydride in order to form an organic sulfite intermediate. To this end, sulfuric acid having a wide variety of concentration strengths can be employed in the process. As such, it will be appreciated that the particular concentration desired will ultimately be dependent upon the particular anhydride and/or carbonaceous material utilized. However, in a preferred embodiment, the sulfuric acid is a commercially available sulfuric acid having a concentration in the range of from approximately 90.0% to approximately 98.0%. In a more preferred embodiment, the sulfuric acid concentration is in the range of from approximately 93.0% to approximately 97.0% In a most preferred embodiment, the sulfuric acid is at least 95.0% concentrated sulfuric acid.

It will similarly be appreciated that a varying amount of acid relative to the anhydride and/or carbonaceous material can be used in the process of the present invention. However, in a preferred embodiment, the weight ratio of acid relative to the anhydride is preferably not greater than approximately 1:5. Likewise, the weight ratio of acid relative to the carbonaceous material is preferably in the range of from approximately 1:2 to approximately 1:3, including such ratios as 1:2.5.

As previously indicated herein, the process of the present invention can be used with a variety of carbonaceous compounds and materials. To this end, any carbonaceous compound or material can be used provided there are sufficient C—H edge sites capable of interacting with the organic sulfite intermediate under conditions effective to provide a desired surface modified carbonaceous material. Accordingly, it is preferred that the carbonaceous material have an initial surface area of at least approximately 25 m²/g as measured by ASTM-D4820. In a more preferred embodiment, when measured by ASTM-D4820, the carbonaceous material will have an initial surface area of at least approximately 100 m²/g. In still a more preferred embodiment, the surface area of the initial carbonaceous material will be greater than approximately 200 m²/g when measured according to the ASTM-D4820 method.

Specific examples of suitable carbonaceous materials and/or compounds include, without limitation, activated charcoal, finely divided carbon, carbon black, graphite, fullerinic carbons, and nanocarbons. In a preferred embodiment, the carbonaceous material is a carbon black having a surface area greater than approximately 200 m²/g.

In order to achieve a surface modified carbonaceous material or compound having increased levels of hydrophilicity, it may be desired, although not required, to further modify the surface bonded sulfonate substituents to provide a salt thereof. To this end, in an alternative embodiment, the process can further comprise the step of treating the surface bonded sulfonate substituents, e.g. —SO$_3$H moieties, with one or more neutralizing agents under conditions effective to provide a sulfonate moiety of the general formula —SO$_3$M surface bonded thereto, wherein M represents a cationic species as defined above.

Suitable neutralizing agents include, without limitation, alkali hydroxides, such as sodium hydroxide, potassium hydroxide, lithium hydroxide, ammonium hydroxide; alkali carbonates and bicarbonates, such as sodium bicarbonate, potassium bicarbonate, and the like; as well as organic bases such, as dimethylethanol amine and triethanol amine. Although any commercially available neutralizing agent and concentration thereof will suffice, the neutralizing agent is preferably a 0.5M, 0.75M, 1M, 1.25M or 1.5M solution of sodium hydroxide.

To this end, the chemistry and conditions required for neutralization of sulfonate substituents is commonly known to one of ordinary skill and need not be discussed at length herein. Therefore, it will be appreciated that arriving at the optimum process conditions for achieving the desired degree and kind of neutralization will require no more than routine experimentation. However, in a preferred embodiment, the neutralizing agent is used in an amount and strength sufficient to provide a resulting pH of at least 8.

If desired, the surface modified carbonaceous material or compound containing a plurality of surface bonded sulfonate substituents, e.g., —SO$_3$M and/or —SO$_3$H moieties, wherein M is defined as above, can be washed with distilled water, filtered and/or dried in order to obtain substantially purified and/or isolated surface modified product.

In an alternative embodiment, the organic sulfite intermediate that reacts with the carbonaceous compound or material can be formed in situ so as to allow the process as described above to be performed in a single reaction. Accordingly, if desired, the process of the present invention can be performed by simultaneously reacting a carbonaceous material or compound to be surface modified with: (1) an anhydride as defined above; and (2) sulfuric acid as defined above, in a single reaction under conditions effective to provide an organic sulfite intermediate of the generic formula:

in situ and to subsequently provide a surface modified carbonaceous compound or material comprising a plurality of sulfonate substituents; e.g., —SO$_3$H moieties, surface bonded thereto.

It will be appreciated that the optimum reaction conditions for the in situ formation of the organic sulfite and subsequent reaction with the carbonaceous compound or material will, of course, vary depending on the particular anhydride, strength of the sulfuric acid, and/or the particular carbonaceous material selected to be surface modified. To this end, arriving at such optimum conditions would be readily obtainable by one of ordinary skill in the art or otherwise can be obtained through no more than routine experimentation.

Nonetheless, in a preferred embodiment wherein the anhydride is acetic anhydride and the carbonaceous material is a carbon black, preferred reaction conditions comprise heating the reaction components to a temperature in the range of from approximately 60° C. to approximately 80° C. for at least approximately 2 hours. In still a more preferred embodiment, the reaction components are heated to a temperature of at least approximately 70° C. for at least approximately 2 hours.

Once again, irrespective of the embodied process used for preparing the surface modified carbonaceous compound, the resulting compound containing the plurality of surface bonded sulfonate substituents, e.g. surface bonded —$SO_3H$ moieties, can be further neutralized with a suitable neutralizing agent as described above. Therefore, those embodiments comprising the in situ formation of the organic sulfite and the subsequent reaction of the organic sulfite with the carbonaceous compound can further comprise the step of treating the surface bonded sulfonate substituents with one or more neutralizing agents under conditions effective to provide a sulfonate moiety of the general formula —$SO_3M$ surface bonded thereto, wherein M once again represents a cationic species as defined herein, such as lithium, sodium, potassium or ammonium.

As previously described herein, suitable neutralizing agents include, without limitation, alkali hydroxides, such as sodium hydroxide, potassium hydroxide, lithium hydroxide, ammonium hydroxide; alkali carbonates and bicarbonates, such as sodium bicarbonate, potassium bicarbonate, and the like; as well as organic bases such, as dimethylethyl amine and triethanol amine. Although any commercially available neutralizing agent and concentration thereof will suffice, in a preferred embodiment the neutralizing agent is a 1M solution of sodium hydroxide.

Additionally, as set forth above, the process comprising the in situ formation of the organic sulfite intermediate and the subsequent reaction with a carbonaceous compound or material to provide a surface modified carbonaceous compound or material can further comprises the steps of washing with distilled water, filtering and/or drying the desired surface modified carbonaceous material in order to obtain substantially purified and/or isolated product.

It will be appreciated upon practicing the methods of the present invention that the inventive methods set forth above advantageously arrive at the desired surface modified carbonaceous materials and compounds in relatively high yields while substantially minimizing the production of undesired oxidative and tarry byproducts typically encountered in the art, such as those discussed in U.S. Pat. No. 3,442,679 to Rivin, et al.

In an alternative aspect, the present invention also provides the surface modified carbonaceous compounds and materials that result from the aforementioned inventive processes. To this end, the surface modified carbonaceous compounds and/or materials according to the present invention exhibit several advantageously improved characteristics over those previously obtained in the art.

In accordance with this aspect, in one embodiment, the invention provides a surface modified carbonaceous material comprising a plurality of sulfonate substituents of the general formula —$SO_3H$ surface bonded thereto.

Additionally, in an alternative embodiment, the invention similarly provides a surface modified carbonaceous material comprising a plurality of sulfonate substituents of the general formula —$SO_3M$, wherein M represents a cationic species as defined herein, including without limitation, ammonium and the group I alkali metals such as lithium, sodium, and potassium.

Moreover, as indicated by a thermometric titration with 1M NaOH, in a preferred embodiment, the surface modified carbonaceous materials of the present invention preferably have a degree of surface modification such that the sulfonate substituents, e.g. —$SO_3H$, and/or —$SO_3M$ moieties, are present in an amount greater than approximately 0.1 milliequivalents per gram of the sulfonated carbonaceous compound. In a more preferred embodiment, a thermometric titration reveals that the degree of sulfonation is such that the amount of surface bonded sulfonate substituent is greater than at least 1.0 milliequivalents per gram of the surface modified carbonaceous material. In still a more preferred embodiment, the surface bonded sulfonate substituent is present in an amount greater than at least 15.0 milliequivalents per gram of surface modified sulfonated carbonaceous material. To this end, as an object of the present invention, it should be understood that the sulfonated compounds and materials of the present invention can further comprise any degree of sulfonation falling within the above-mentioned values, or even exceeding said values.

In an alternative embodiment, the degree of sulfonation or presence of sulfonate substituents surface bonded to the carbonaceous compound or material can be measured by XPS (X-ray Photoelectron Spectroscopy). Accordingly, several embodiments of the present invention provide surface modified carbonaceous compounds or materials that exhibit a surface atomic concentration of sulfur within the sulfonate substituents, as measured by XPS (using the Physical Electronics 5802 Multitechnique with Al K$\alpha$ X-ray source), of at least approximately 0.25%, 0.30%, 0.35%, 0.5%, 0.8%, 1.0%, 1.3%, 1.5%, 1.7%, 1.8%, 2.0%, 3.0%, 4.0%, 4.5% or even 5.0%. To this end, in a preferred embodiment, the surface atomic concentration of sulfur is in the range of from at least approximately 0.25% to approximately 5.0%, or in the range of from 0.30% to approximately 5.0%, or even in the range of from approximately 0.35% to approximately 5.0% relative to the total surface atomic concentration of the surface modified carbonaceous compound or material. It is to be understood, that when practiced with an appropriate carbonaceous material and reaction conditions, the present invention will further provide a surface modified carbonaceous material wherein the surface atomic concentration of sulfur even exceeds the above-referenced ranges and values. Therefore, the degree of surface modification and measured surface atomic concentration of sulfur will be dependent, at least in part, on the surface area of the initial carbonaceous material that is used.

Figure 1:
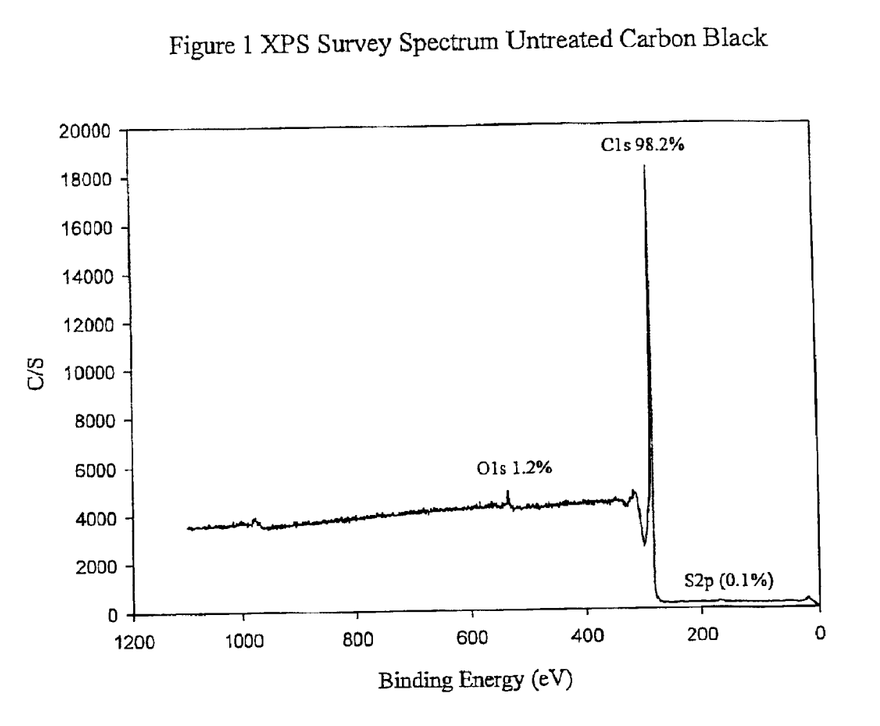
FIG. 1 is a plot of the XPS spectrum of the carbon black used to prepare the sulfonated product of Example 1.
Figure 2:
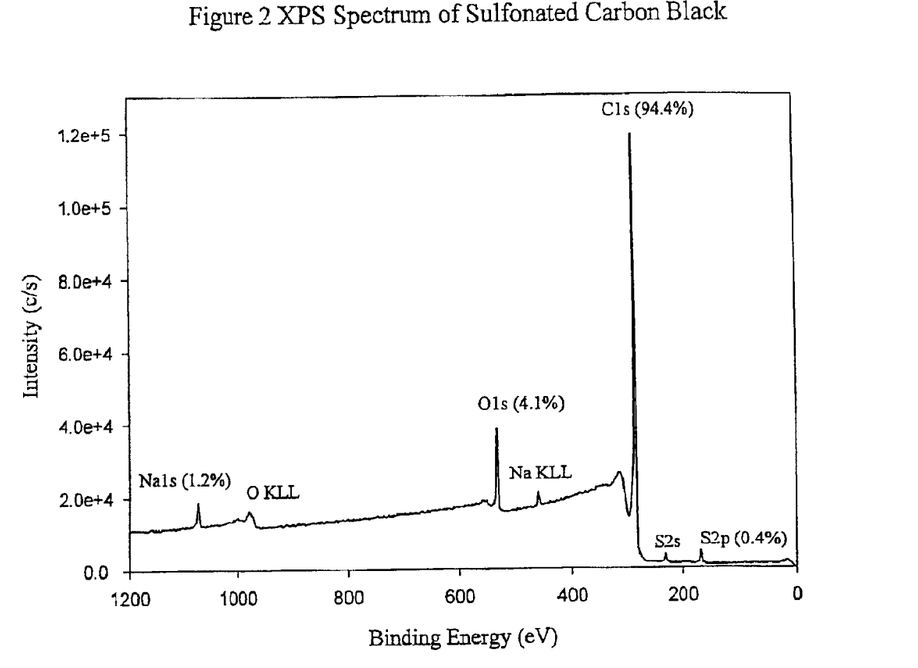
FIG. 2 is a plot of the XPS spectrum of the neutralized sulfonated carbon black produced in Example 1.

For example, with specific reference to FIG. 2, which indicates the XPS surface atomic concentration spectrum of the neutralized sulfonated carbon black composition of Example 1, the sulfur species contained within the sulfonate substituent is present in an amount of approximately 0.4% relative to the total surface atomic concentration of the sulfonated carbon black compound. When compared to FIG. 1, which similarly indicates the XPS surface atomic concentration spectrum of the carbon black compound prior to sulfonation, i.e., 0.1%, it is revealed that, in accordance with one embodiment, the surface atomic concentration of surface bonded sulfur species has been enhanced by approximately 300%, from approximately 0.1% to approximately 0.4%.

Figure 4:
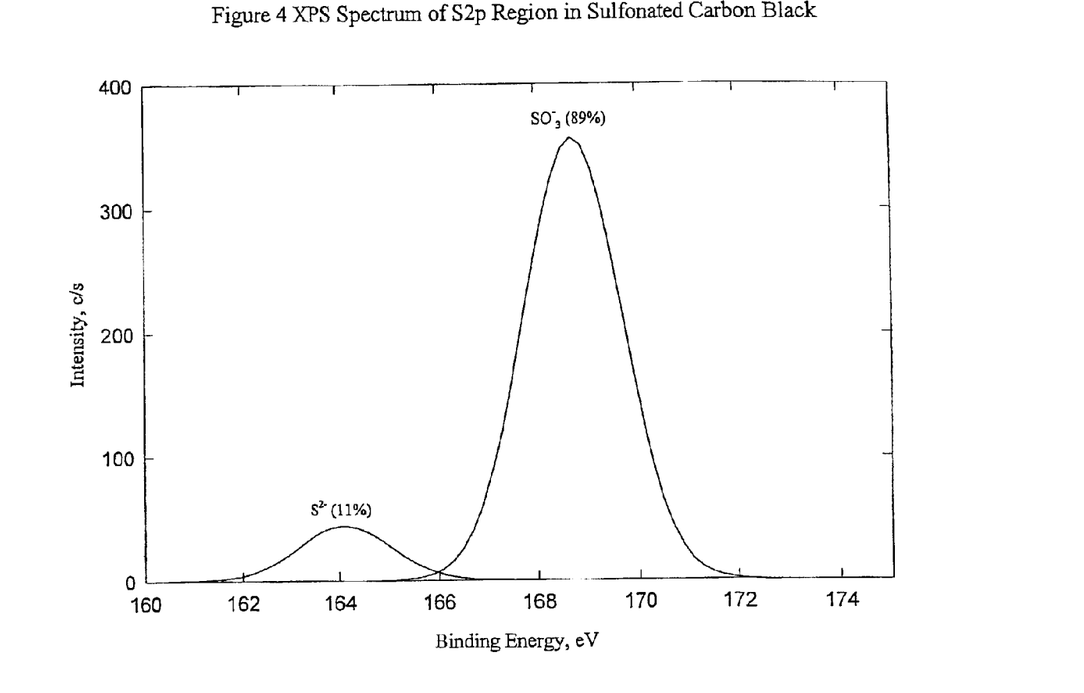
FIG. 4 is a plot of the XPS spectrum of the sulfonated carbon black produced in Example 1, indicating the percentage of sulfur species that are present in the surface bonded sulfonate substituents.
Figure 5:
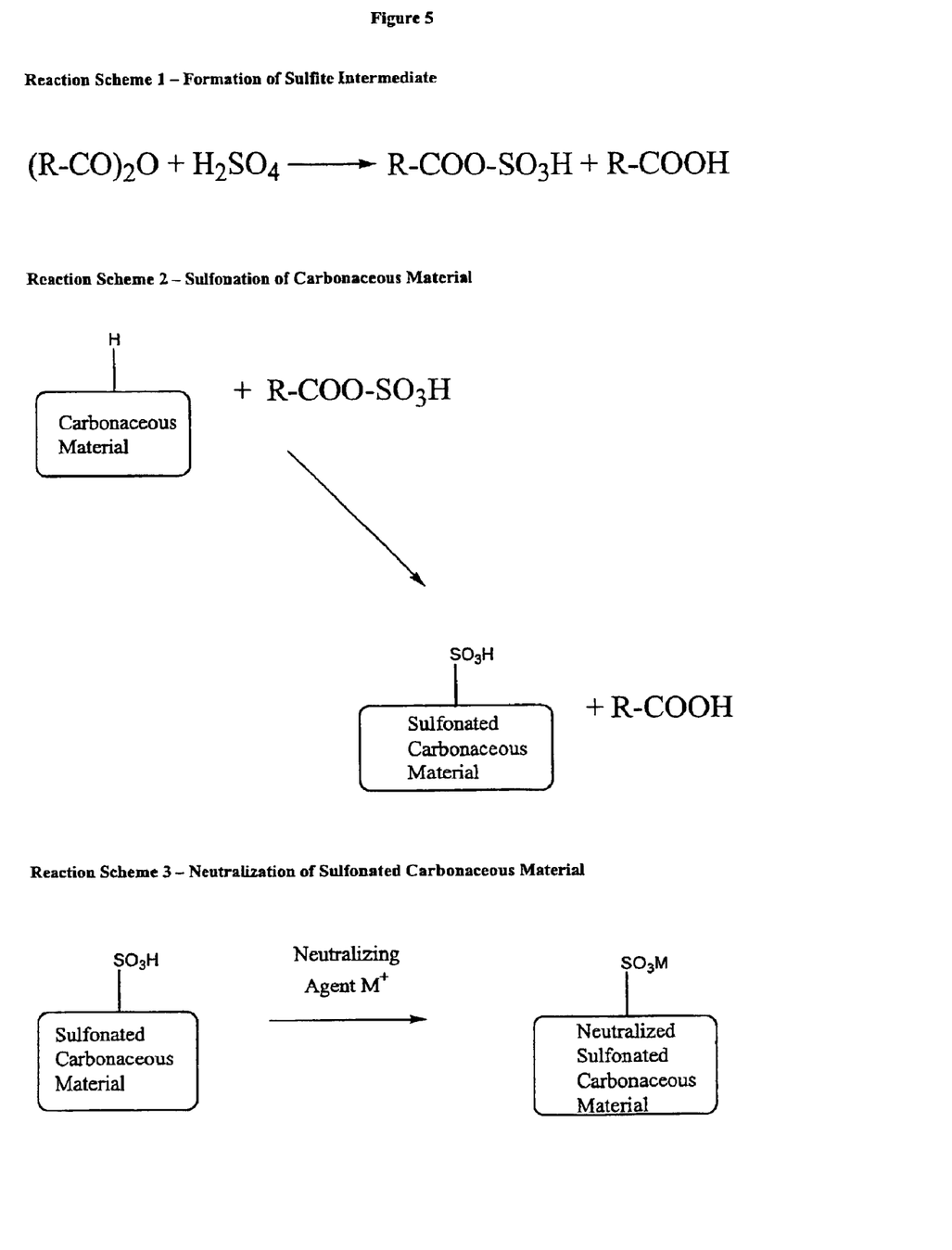
FIG. 5 is an illustration of a reaction scheme according to one embodiment of the present invention.

Furthermore, specific reference to FIG. 4 reveals that approximately 89% of the surface bonded sulfur species measured in FIG. 2 is present as a component of the surface bonded sulfonate substituent. Therefore, it follows that surface modified carbon black of Example 1 has a surface atomic concentration of sulfur present within the surface bonded sulfonate substituents of approximately 0.36%, i.e., 89% of the 0.4% surface atomic concentration of sulfur species measured in FIG. 2.

Likewise, XPS measurement can be used to indicate the degree of surface modification by measuring the surface atomic concentration of oxygen species surface bonded to the carbonaceous material before and after the sulfonation reaction.

Figure 3:
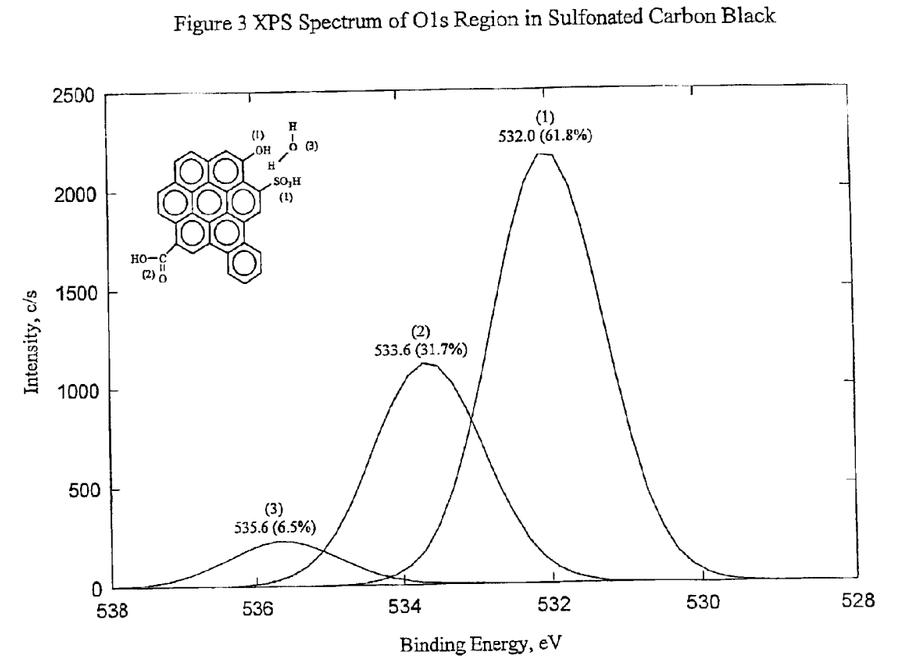
FIG. 3 is a plot of the XPS spectrum of the sulfonated carbon black produced in Example 1, indicating the percentage of oxygen species that are present in the surface bonded sulfonate substituents.

For example, with specific reference again to FIG. 2, the surface atomic concentration of oxygen present within the sulfonated carbon composition of Example 1 is approximately 4.1%. This compares to an initial oxygen concentration of 1.2% prior to sulfonation, as indicated by FIG. 1. Moreover, reference to FIG. 3 indicates that approximately 61.8% of the surface bonded oxygen species are present as a component of the surface bonded sulfonate substituents. Therefore, it follows that surface modified carbon black of Example 1 has a surface atomic concentration of oxygen present within the surface bonded sulfonate substituents of approximately 2.50%, i.e., 61.8% of the 4.1% surface atomic concentration of oxygen species measured in FIG. 2.

In similar fashion, an XPS measurement can also be utilized to indicate the degree of surface modification by measuring the surface atomic concentration of the entire sulfonate substituent, e.g., —$SO_3M$, wherein M is hydrogen or a cationic species as defined herein. To this end, the surface modified carbonaceous compounds and materials of the present invention preferably exhibit a surface atomic concentration of the sulfonate substituent, when measured by XPS, in the range of from approximately 0.25% to approximately 5.0%, including additional values of at least approximately 0.5%, 1.0%, 1.5%, 2.0%, 2.5%, 3.0%, 3.5%, 4.0%, and 4.5%.

As previously described herein, the carbonaceous compounds or materials can be any carbonaceous compound, material or composition provided it contains sufficient C—H edge sites capable of interacting with the organic sulfite intermediate under conditions effective to provide a desired surface modified carbonaceous compound, material or composition.

Accordingly, it is preferred that the carbonaceous materials or compounds have an initial surface area of at least approximately 25 $m^2$/g as measured by ASTM-D4820. In a more preferred embodiment, when measured by ASTM-D4820, the carbonaceous material or compound will have an initial surface area of at least approximately 100 $m^2$/g. In still a more preferred embodiment, the initial surface area of the carbonaceous compound will be greater than approximately 200 $m^2$/g when measured according to the ASTM-D4820 method.

Specific examples of suitable carbonaceous compounds and materials include, without limitation, activated charcoal, finely divided carbon, carbon black, graphite, fullerinic carbons, and nanocarbons. In a preferred embodiment, the carbonaceous material is a carbon black having a surface area greater than approximately 200 $m^2$/g.

Among the several advantages that are obtained by practicing the present invention, the surface modified carbonaceous materials and compounds of the present invention exhibit an improved storage stability and dispersibility in aqueous and waterborne formulations. Specifically, when tested after storage periods of at least one week, one month or even three months, an aqueous dispersion containing the surface modified compounds and materials of the present invention will exhibit substantially no visual flocculation.

Likewise, after similar storage periods of at least one week, one month or even three months, an aqueous dispersion of a surface modified carbonaceous compound as described herein will advantageously pass through a filter having a mesh size in the range of from approximately 8 microns to approximately 10 microns, such as a Whatman #42 filter paper, leaving substantially no visual agglomerates.

Accordingly, these and other advantageous properties of the inventive surface modified compounds described herein facilitate their viability in several aqueous formulations. As such, in still another aspect, the present invention further provides several end use formulations for the surface modified carbonaceous compounds and materials set forth above.

To this end, the present invention also provides an aqueous composition comprising a surface modified carbonaceous material as set forth above and water. The self dispersibility and long term stability of a surface modified carbon black according to the present invention is particularly suited for this embodiment as it can be used to provide a waterborne ink formulation suitable for use in, among other applications, inks and in particular, ink jet printing and related technology.

To this end, when an ink dispersion is used in ink jet applications, it is necessary to eject the ink in the form of stable droplets through a minute orifice in the ink jet recording head or device. Therefore, it is very important that the ink formulation, and the pigment dispersion contained therein, remain dispersed and stable so as not to flocculate, i.e., coagulate or agglomerate, and potentially clog the orifice. Advantageously, the self-dispersing sulfonated carbonaceous compounds and materials of the present invention remain stable indefinitely when dispersed in waterborne systems. Additionally, these aqueous dispersions do not require the use of additional dispersing agents to remain stable, which may undesirably increase the viscosity of such a formulation. Moreover, the need for such additional dispersing agents would render such dispersions economically undesirable due to the increased costs associated therewith.

When the sulfonated compounds and materials of the present invention are utilized in an aqueous dispersion, the surface modified carbonaceous compound, e.g., carbon black, can surprisingly be present in an amount of from approximately 1 wt % to approximately 40 wt. % relative to the entire aqueous dispersion. In a preferred embodiment, the dispersion comprises in the range of from approximately 10 wt. % to approximately 40 wt. % of sulfonated carbon black. Furthermore, as indicated above, the aqueous dispersion remains stable indefinitely, exhibiting substantially no visual flocculation.

Likewise, an aqueous dispersion according to these embodiments would therefore preferably comprise water in an amount ranging from at least approximately 10% to approximately 99.0% by weight of the entire aqueous formulation.

If desired, aqueous dispersions and formulations comprising the surface modified carbonaceous compounds of the present invention can further comprise one or more humectants selected from ethylene glycol, diethylene glycol, propylene glycol, dipropylene glycol, polyethylene glycol, polypropylene glycol, alcohol derivatives such as ethanol, propanol, isopropanol and the like, and cellosolve. It will be appreciated that the humectant is optionally introduced as a means to maintain a substantially constant moisture content of the aqueous dispersions and formulations.

Additionally, a waterborne formulation or dispersion according to the present invention can optionally contain one or more additional additives such as a polymer binder; e.g., Joncryl J-61 (Acrylic polymer, manufacture and available from S.C. Johnson Wax.), surfactants such as Surfynol 695 or Surfynol 7608, and one or more biocide compositions.

To this end, the polymer binder acts as a film forming component allowing a formulation such, as an aqueous ink, to have substantial fastness and staying potential thus allowing the ink to bind to the medium once water and other optional solvents have evaporated.

Additionally, the incorporation of an optional biocide component may also be desired in order to control and/or prevent the potential growth of algae and other microorganisms, which are typically prone to develop in an aqueous system or formulation.

It will be appreciated that the aqueous dispersions comprising the sulfonated carbonaceous compounds of the present invention can be prepared using any milling or dispersing machine known to one of ordinary skill in the art, including without limitation, shear stress machines such as a two or three roll mill, machines which disperse pigment particles with impact strength caused by the collision between media such as glass beads, zirconia beads, steel beads, agate beads, such as a ball mill or pearl mill, or even with machines that finely disperse pigment particles with a collision force or a shear stress among the pigment particles or between the pigment particles and a vehicle or a wall surface, such as a kneader or an extruder.

EXAMPLES

The following examples are put forth so as to provide those of ordinary skill in the art with a complete disclosure and description of how the compounds, compositions, articles, devices and/or methods claimed herein are made and evaluated, and are intended to be purely exemplary of the invention and are not intended to limit the scope of what the inventors regard as their invention. Efforts have been made to ensure accuracy with respect to numbers (e.g., amounts, temperature, etc.); however, some errors and deviations may have occurred. Unless indicated otherwise, parts are parts by weight, temperature is degrees C. or is at ambient temperature, and pressure is at or near atmospheric.

The amount or property of a compound as provided herein means such amount as that capable of performing the function of the compound or property for which an amount is expressed. As will be pointed out below, the exact amount required will vary from process to process, depending on recognized variables such as the compounds employed and the processing conditions observed. However, an appropriate amount may be determined by one of ordinary skill in the art using only routine experimentation.

Example 1

Preparation of Sulfonated Carbon Black 100 grams of carbon black (Raven 2500 Ultra, manufactured by Columbian Chemical Company, Marietta, Ga., U.S.A.) having a surface area of 270 $m^2/g$ as measured by ASTM-D4820 and an oil absorption of 67 ml/100 g as measured by ASTM-D2414 was added to a flask containing a mixture of 20 mL of concentrated sulfuric acid (95.7%) and 300 mL of acetic anhydride. The reaction mixture was continuously stirred for approximately 2 hours while being heated at a temperature of 70° C. After 2 hours, the reaction mixture was cooled and filtered by washing with distilled water. The resulting carbon black cake was then re-dissolved in 300 mL of distilled water and subsequently neutralized with 1M NaOH solution. The resulting slurry was filtered and dried at a temperature of 110° C. for a period of approximately 4 hours.

The resulting product comprised a plurality of sodium sulfonate substituents of the general formula —$SO_3Na$ as indicated by XPS measurement wherein the surface atomic concentration of sulfur was approximately 0.4% and the surface atomic concentration of sodium was approximately 1.2% (See FIG. 2). Likewise, reference to FIG. 4 reveals that approximately 89% of the surface bonded sulfur species measured in FIG. 2 was present as a component of the surface bonded sulfonate substituent. Therefore, the surface modified carbon black product had a surface atomic concentration of sulfur present within the surface bonded sulfonate substituents of approximately 0.36%, i.e., 89% of the 0.4% surface atomic concentration of sulfur species measured in FIG. 2.

Example 2

Sample Waterborne Dispersion Formulation

A sample waterborne dispersion formulation for use in an aqueous flexographic printing system would be prepared using a sulfonated carbon black compound as prepared in Example 1. The formulation would comprise:

| | |
|---|---|
| Water: | 20.4 wt % |
| Isopropyl Alcohol: | 3.7 wt % |
| Sulfonated Carbon Black of Example. 1: | 14.8 wt. % |
| Joncryl J-61 (Acrylic polymer, obtained from S. C. Johnson Wax) | 61.1 wt. % |

Example 3

Sample Ink Jet Formulation

A sample ink jet formulation for use in an ink jet printing system would be prepared using a sulfonated carbon black compound as prepared in Example 1. The formulation would comprise:

| | |
|---|---|
| Water | 73.55 wt. % |
| Glycerol | 8.00 wt. % |
| Diethylene Glycol | 10.00 wt. % |
| Surfynol 695 (Obtained from Air Products, Allentown, Pennsylvania) | 3.00 wt. % |
| Surfynol 7608 (Obtained from Air Products, Allentown, Pennsylvania) | 2.50 wt. % |
| Sulfonated Carbon Black of Ex. 1 | 2.75 wt. % |
| Biocide | 0.20 wt. % |

Throughout this application, where various publications are referenced, the entire disclosures of these publications are hereby incorporated by reference into this application for all purposes.

While this invention has been described in connection with preferred embodiments and specific examples, it is not intended to limit the scope of the invention to the particular embodiments set forth, but on the contrary, it is intended to cover such alternatives, modifications, and equivalents as may be included within the spirit and scope of the invention as defined by the appended claims. For example, there are numerous variations and combinations of components and or conditions, e.g., the carbonaceous compound, sulfuric acid concentrations, the particular anhydride and the like that can be used to optimize the results obtained from the described embodiments. To this end, one skilled in the art will appreciate that in practicing the present invention, only reasonable and routine experimentation will be required to optimize such conditions.

What is claimed is:

1. An ink composition, comprising
   a) a surface modified carbonaceous material;
   b) water;
   c) at least one acrylic polymer; and
   d) at least one organic solvent;
   wherein the surface modified carbonaceous material comprises a plurality of sulfonate substituents of the general formula —$SO_3M$ surface bonded thereto, wherein M is hydrogen or a cationic species, and wherein the surface atomic concentration of sulfur present within the surface bonded $SO_3M$ moieties, measured by XPS, is greater than or equal to approximately 0.25% relative to the total surface atomic concentration of the surface treated carbonaceous material.

2. The ink composition of claim 1, wherein the surface atomic concentration of the sulfur is in the range of from approximately 0.25% to approximately 5.0%.

3. The ink composition of claim 1, wherein the surface atomic concentration of the sulfur is in the range of from approximately 0.35% to approximately 5.0%.

4. The ink composition of claim 1, wherein the carbonaceous material is carbon black, graphite, finely divided carbon, activated charcoal, fullerenic carbon, or nanocarbon.

5. The ink composition of claim 1, wherein the carbonaceous material is carbon black.

6. The ink composition of claim 1, wherein M is a cationic species of sodium, potassium, lithium or ammonium.

7. The ink composition of claim 1, wherein M is sodium.

8. The ink composition of claim 1, having a surface area greater than approximately 200 m2/g.

9. The ink composition of claim 1, wherein the plurality of sulfonate substituents are present in an amount greater than approximately 1.0 milliequivalents per gram of the modified carbonaceous material.

10. The ink composition of claim 1, wherein the material exhibits substantially no visual flocculation after a period of at least approximately three months when dispersed in an aqueous medium.

11. A process for the manufacture of a surface modified carbonaceous material, wherein the process comprises the steps of:
   a) contacting an anhydride of the generic formula (R—CO)$_2$O with sulfuric acid under conditions effective to provide an organic sulfite intermediate of the generic formula R—(CO)O—$SO_3H$, wherein R is an aliphatic substituent; and
   b) contacting a carbonaceous material with the organic sulfite intermediate provided in step a) under conditions effective to provide a surface modified carbonaceous material comprising a plurality of surface bonded sulfonate substituents of the general formula —SO3H.

12. The process of claim 11, further comprising treating the surface modified carbonaceous material provided in step b) with a neutralizing agent under conditions effective to provide a surface modified carbonaceous material comprising a plurality of sulfonate substituents of the general formula —SO3M surface bonded thereto, wherein M is a cationic species.

13. The process of claim 12, wherein the cationic species is sodium, potassium, lithium or ammonium.

14. The process of claim 12, wherein M is sodium and wherein the neutralizing agent is sodium hydroxide.

15. The process of claim 12, further comprising the step of filtering and substantially drying the surface modified carbonaceous material comprising a plurality of sulfonate substituents of the general formula —$SO_3M$ surface bonded thereto at a temperature of at least approximately 100° C.

16. The process of claim 11, wherein the carbonaceous material is carbon black, graphite, finely divided carbon, activated charcoal, fullerinic carbon or nanocarbon.

17. The process of claim 11, wherein the carbonaceous material is carbon black.

18. The process of claim 11, wherein the anhydride is acetic anhydride.

19. The process of claim 11, wherein the sulfuric acid is at least approximately a 95% concentrated sulfuric acid.

20. The process of claim 11, wherein steps a) and b) are performed in a single reaction by simultaneously contacting the carbonaceous material with:
   ii) the anhydride of the generic formula (R—CO)2O; and
   iii) the sulfuric acid,
   under conditions effective to provide the organic sulfite intermediate of the generic formula R—(CO)O—$SO_3H$ in situ and to provide the surface modified carbonaceous material comprising a plurality of surface bonded sulfonate substituents of the general formula —$SO_3H$.

21. The process of claim 20, further comprising treating the surface modified carbonaceous material with a neutralizing agent under conditions effective to provide a surface modified carbonaceous material comprising a plurality of sulfonate substituents of the general formula —SO3M surface bonded thereto, wherein M is a cationic species.

22. The process of claim 20, wherein the conditions effective to provide the organic sulfite intermediate of the generic formula R—(CO)O—$SO_3H$ in situ and to provide the surface modified carbonaceous material comprising a plurality of surface bonded sulfonic substituents of the general formula —$SO_3H$ comprise heating the components i) and ii) to at least approximately 70° C. for at least approximately 2 hours.

* * * * *